United States Patent
Fujinami et al.

(10) Patent No.: US 11,714,606 B2
(45) Date of Patent: Aug. 1, 2023

(54) MULTIPLY-ACCUMULATE SYSTEM AND MULTIPLY-ACCUMULATE METHOD

(71) Applicant: Sony Corporation, Tokyo (JP)

(72) Inventors: Yasushi Fujinami, Tokyo (JP); Hiroyuki Yamagishi, Tokyo (JP)

(73) Assignee: Sony Group Corporation, Tokyo (JP)

(*) Notice: Subject to any disclaimer, the term of this patent is extended or adjusted under 35 U.S.C. 154(b) by 292 days.

(21) Appl. No.: 17/057,365

(22) PCT Filed: Jul. 4, 2019

(86) PCT No.: PCT/JP2019/026658
§ 371 (c)(1),
(2) Date: Nov. 20, 2020

(87) PCT Pub. No.: WO2020/013075
PCT Pub. Date: Jan. 16, 2020

(65) Prior Publication Data
US 2021/0191691 A1     Jun. 24, 2021

(30) Foreign Application Priority Data
Jul. 12, 2018   (JP) ................... 2018-132621

(51) Int. Cl.
*G06F 7/544* (2006.01)
*G06F 7/50* (2006.01)
*G06F 7/523* (2006.01)

(52) U.S. Cl.
CPC .............. *G06F 7/5443* (2013.01); *G06F 7/50* (2013.01); *G06F 7/523* (2013.01)

(58) Field of Classification Search
CPC . G06F 7/50–5095; G06F 7/523–53338; G06F 7/5443; G06F 17/18; G06N 3/04; G06N 3/049; G06N 3/063; G06N 3/08; G06N 3/084; G06T 3/4046; G06K 9/6298
See application file for complete search history.

(56) References Cited

U.S. PATENT DOCUMENTS

2017/0262962 A1* 9/2017 Rad ..................... G06T 5/007

FOREIGN PATENT DOCUMENTS

JP          2017-156941 A      9/2017

OTHER PUBLICATIONS

D. Maliuk et al, An Experimentation Platform for On-Chip Integration of Analog Neural Networks: A Pathway to Trusted and Robust Analog/RF ICs, IEEE Transactions on Neural Networks and Learning Systems, vol. 26, No. 8, 2015 (Year: 2015).*
T. Morie et al., A Multinanodot Floating-Gate Mosfet Circuit for Spiking Neuron Models, IEEE Transactions on Nanotechnology, vol. 2, No. 3, 2003 (Year: 2003).*

(Continued)

*Primary Examiner* — Emily E Larocque
(74) *Attorney, Agent, or Firm* — Michael Best & Friedrich LLP

(57) ABSTRACT

A multiply-accumulate system (1) includes: a statistic calculation unit (111) that executes a standardization calculation for an input signal; and a multiply-accumulate device (10) that executes multiplication-accumulation based on the standardized input signal.

12 Claims, 11 Drawing Sheets

(56) References Cited

OTHER PUBLICATIONS

T. Tohara et al., Silicon nanodisk array with a fin field-effect transistor for time-domain weighted sum calculation toward massively parallel spiking neural networks, applied physics express 9, 034201, 2016 (Year: 2016).*
International Search Report (PCT/ISA/210), International Application No. PCT/JP2019/026658, dated Aug. 15, 2019.
Notification of Transmittal of the International Search Report and the Written Opinion of the International Searching Authority, or the Declaration (PCT/ISA/220), International Application No. PCT/JP2019/026658, dated Aug. 27, 2019.
Written Opinion of the International Search Authority (PCT/ISA/237), International Application No. PCT/JP2019/026658, dated Aug. 27, 2019.

* cited by examiner

| STANDARDIZATION METHOD | $1/\alpha$ | OUTPUT TIME DIFFERENCE |
|---|---|---|
| ORIGINAL | — | 5.7E-10 |
| STANDARDIZATION FOR EACH IMAGE | 1/1 | 1.1E-09 |
| | 1/3 | 9.0E-10 |
| | 1/6 | 5.2E-10 |

| STANDARDIZATION METHOD | $1/\alpha$ | OUTPUT TIME DIFFERENCE |
|---|---|---|
| ORIGINAL | — | 5.7E-10 |
| STANDARDIZATION BY LEARNING DATA | 1/1 | 1.2E-09 |
| | 1/3 | 1.1E-09 |
| | 1/6 | 5.3E-10 |

FIG.14

START
↓
ACQUIRE LEARNING DATA — S201
↓
STANDARDIZE PIXEL VALUES BASED ON LEARNING DATA — S202
↓
MULTIPLY STANDARDIZED DATA BY COEFFICIENT — S203
↓
CLIP STANDARDIZED DATA — S204
↓
OUTPUT STANDARDIZED DATA TO MULTIPLIER-ACCUMULATOR — S205
↓
END

MULTIPLY-ACCUMULATE SYSTEM AND MULTIPLY-ACCUMULATE METHOD

FIELD

The present disclosure relates to a multiply-accumulate system and a multiply-accumulate method.

BACKGROUND

In recent years, various neural network calculation circuits have been proposed.

For example, Patent Literature 1 discloses a technique for executing a calculation based on rising timing of a signal output from a comparator in a time-axis analog multiply-accumulate circuit including RC circuits and the comparator.

CITATION LIST

Patent Literature

Patent Literature 1: WO 2018/034163 A

SUMMARY

Technical Problem

However, in the above-described conventional technique, an output from a multiplier-accumulator in a previous stage is directly output to a multiplier-accumulator in a subsequent stage. In this case, the timing of each signal output from the comparator is reduced, and it may be difficult to determine timing at which the signal is output.

Therefore, the present disclosure proposes a multiply-accumulate system and a multiply-accumulate method which are capable of expanding the timing of the signal output.

Solution to Problem

To solve the problem described above, a multiply-accumulate system includes: a statistic calculation unit that executes a standardization calculation for an input signal; and a multiply-accumulate device that executes multiplication-accumulation based on the standardized input signal.

Advantageous Effects of Invention

According to the present disclosure, the timing of the signal output can be expanded. Note that the effect described here is not necessarily limited and may be any effect described in the present disclosure.

BRIEF DESCRIPTION OF DRAWINGS

FIG. 13 is a diagram for explaining an output time difference between outputs from multipliers-accumulators of the multiply-accumulate system according to the second embodiment of the present disclosure.

FIG. 14 is a diagram illustrating an example of a processing flow of a calculation device of the multiply-accumulate system according to the second embodiment of the present disclosure.

DESCRIPTION OF EMBODIMENTS

Figure 1:
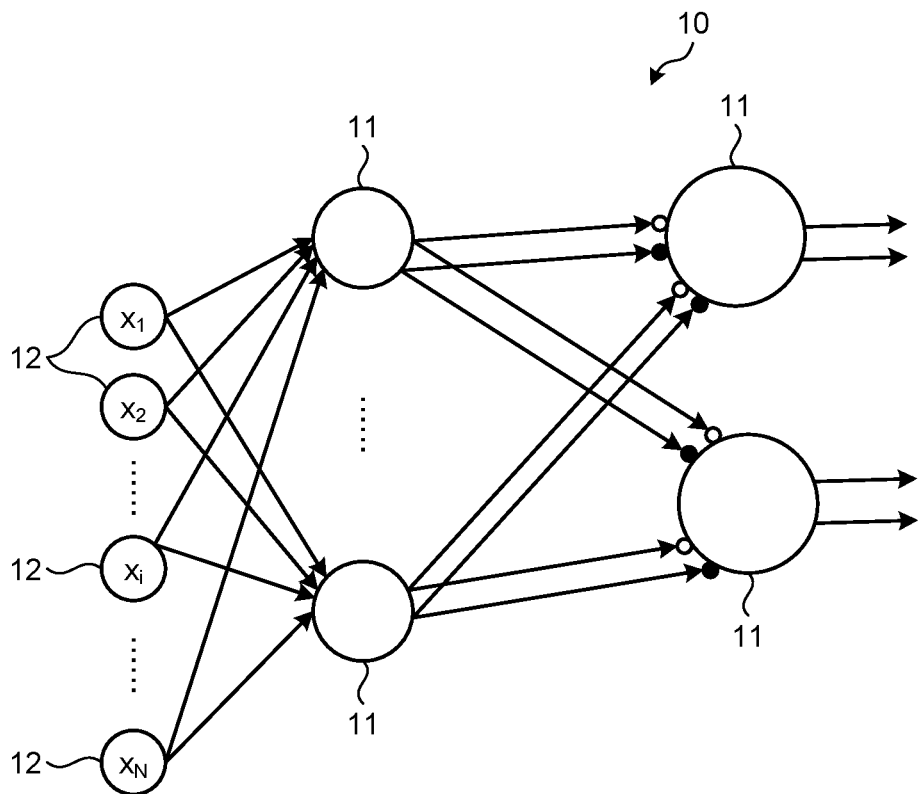
FIG. 1 is a schematic diagram illustrating a multiply-accumulate device.

A detailed description will be given below of embodiments of the present disclosure with reference to the drawings. Note that, in the following respective embodiments, the same reference numerals are given to the same portions, and a duplicate description will be omitted.

Further, the present disclosure will be described in the following item order.

1. Outline
    1-1. Outline of multiply-accumulate device
    1-2. Outline of multiplier-accumulator
    1-3. Network configuration of multiply-accumulate device
2. First Embodiment
    2-1. Configuration of multiply-accumulate system according to first embodiment
    2-2. Standardized image data according to first embodiment
    2-3. Output time difference of multiply-accumulate system according to first embodiment
    2-4. Standardization procedure according to first embodiment
3. Second Embodiment
    3-1. Configuration of multiply-accumulate system according to second embodiment
    3-2. Standardized image data according to second embodiment
    3-3. Output time difference of multiply-accumulate system according to second embodiment
    3-4. Standardization procedure according to second embodiment

1. Outline

[1-1. Outline of Multiply-Accumulate Device]

First, a description will be given of an outline of a multiply-accumulate device 10 to which each embodiment of the present disclosure is applied. Each multiplier-accumulator 11 of the multiply-accumulate device 10 according to each embodiment of the present disclosure associates a load (weight) $w_i$ with each of N electrical signals $I_i$, and derives a sum of N multiplication values each obtained by multiplying each value of the electrical signal $I_i$ and the load $w_i$, which make a pair, by each other. Here, N is a natural number of 2 or more, and i is a natural number of N or less.

It is assumed that the value represented by the electrical signal $I_i$ (hereinafter, also simply referred to as an electrical signal) is $x_i$, and that the N electrical signals are given to one multiplier-accumulator 11 within a predetermined period $T_i$. In this case, the sum of the N multiplication values, which is obtained by the multiplier-accumulator 11, is represented by the following equation (1).

$$\sum_{i=1}^{N} w_i \cdot x_i \tag{1}$$

As illustrated in FIG. 1, the multiply-accumulate device 10 has a structure in which a plurality of the multipliers-accumulators 11 is provided in each of a plurality of layers. Each of the plurality of multipliers-accumulators 11 in a lowest layer obtains a calculation target value based on values $x_i$ represented by the N electrical signals (for example, pulse signals) given from a plurality of external input units 12 and the load $w_i$ applied to the respective electrical signals. Then, each of the multipliers-accumulators 11 transmits an electrical signal, which represents the calculation target value, to multipliers-accumulators 11 in an upper layer.

Such multipliers-accumulators 11 in the upper layer each associate the load $w_i$ individually with the values of the electrical signals sent from the plurality of multipliers-accumulators 11 in the lower layer, and obtain a calculation target value. Then, each of the multipliers-accumulators 11 in the upper layer transmits an electrical signal, which represents the calculation target value, to multipliers-accumulators 11 in a further upper layer. The multiply-accumulate device 10 according to each embodiment of the present disclosure is designed so as to be applicable to a neural network. Such a multiply-accumulate device 10 performs, a plurality of times, processing for obtaining the calculation target values by the multipliers-accumulators 11 in the upper layer based on the calculation target values obtained by the multipliers-accumulators 11 in the lower layer. Thus, the multiply-accumulate device 10 executes image recognition processing and the like.

[1-2. Outline of Multiplier-Accumulator]

Figure 2:
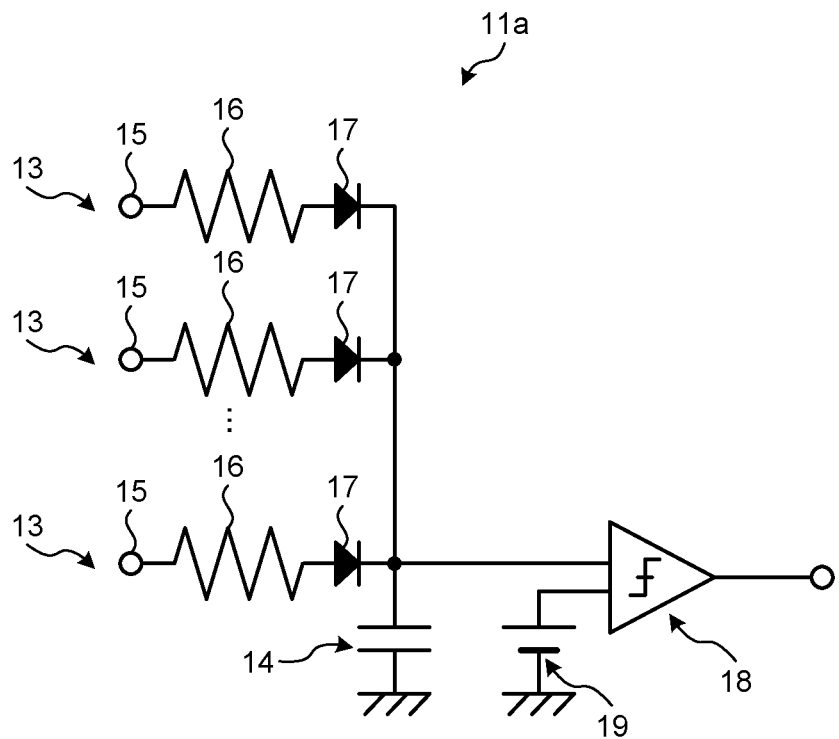
FIG. 2 is a schematic diagram of a multiplier-accumulator of the multiply-accumulate device.

Referring to FIG. 2, a description will be given of a configuration and processing of a multiplier-accumulator 11a, which are an outline of the multiplier-accumulator 11. Here, the description will be given on the assumption that the electrical signal $x_i$ is a variable of 0 or more and 1 or less. Note that, though there are a positive load $w_i^+$ that is a positive value and a negative load $w_i^-$ that is a negative value in the load $w_i$, the description will be given here on the assumption that there is no distinction between the positive and negative of the load.

As illustrated in FIG. 2, the multiplier-accumulator 11a includes N input units 13, a storage unit 14, a comparison unit 18, and a threshold power supply 19.

The N input units 13 are connected in parallel to one another. Each of the input units 13 associates the load $w_i$ with the electrical signal given within the predetermined period $T_1$, and outputs an electric charge having a magnitude corresponding to the value obtained by multiplying the electrical signal $x_i$ and the load $w_i$ by each other. Further, as illustrated in FIG. 2, each input unit 13 includes an input terminal 15, a resistor 16, and a diode 17. The input terminal 15, the resistor 16, and the diode 17 are connected in series to one another. In each input unit 13, for example, each input terminal 15 is given an electrical signal of the same magnitude at different timing within the period $T_i$.

The storage unit 14 is connected to each input unit 13 and stores the electric charge output from each input unit 13. The storage unit 14 is, for example, a capacitor.

Outside the multiplier-accumulator 11a, a length of the period $T_1$ is defined as $T_{in}$, and the following equation (2) is used, whereby the value $x_i$ represented by the electrical signal is converted into timing $t_i$ when the electrical signal is given. That is, the electrical signal is input to the input terminal 15 at the timing $t_i$.

$$t_i = T_{in}(1 - x_i) \tag{2}$$

Assuming that a waveform that is generated from the timing $t_i$ when the electrical signal is given and increases or decreases in proportion to the passage of time t is defined as a response waveform W, an electric charge amount $P_i(t)$ supplied from each input unit 13 to the storage unit 14 can be represented by a magnitude of the response waveform W. Assuming that a slope of the response waveform W with respect to the passage of time t is defined as $k_i$, the load $w_i$ can be converted into $k_i$ using the following equation (3).

$$k_i = \lambda w_i \tag{3}$$

Here, assuming that a waveform obtained by adding all the response waveforms W to one another is defined as a composite waveform TW, a magnitude of the composite waveform TW is the sum total of $P_1(t), P_2(t), P_3(t), \ldots$, and $P_N(t)$. This is equal to a voltage generated by the storage unit 14. Here, the voltage held in the storage unit 14 is defined as $V_N(t)$.

The comparison unit 18 compares a threshold and a signal input thereto with each other, and outputs a step waveform when the input signal exceeds the threshold. The comparison unit 18 is, for example, a comparator. The comparison unit 18 is connected to the storage unit 14 and the threshold power supply 19.

The threshold power supply 19 gives the threshold voltage to the comparison unit 18. Here, a magnitude of the threshold voltage is defined as $\theta$. In this case, the comparison unit 18 outputs the step waveform at timing at which the voltage $V_N(t)$ held in the storage unit 14 exceeds the threshold $\theta$. Assuming that the timing at which $V_N(t)$ reaches the threshold $\theta$ is defined as $t_v$, the following equation (4) is obtained.

$$\sum_{i=1}^{N} k_i(t_v - t_i) = \theta \tag{4}$$

Then, assuming that the sum total of the loads $w_i$ is defined as $\beta$, $\beta$ can be represented by the following equation (5).

$$\beta = \sum_{i=1}^{N} w_i \tag{5}$$

Then, from the equations (2) to (5), the calculation target value of the multiplier-accumulator 11a can be represented by the following equation (6).

$$\sum_{i=1}^{N} w_i \cdot x_i = \frac{\theta/\lambda + \beta(T_{in} - t_v)}{T_{in}} \quad (6)$$

Here, it is assumed that all of the loads $w_i$ are positive values. In this case, when the value $x_i$ represented by the electrical signal given to each input terminal 15 is a minimum value 0, a left side of the equation (6) becomes 0, so that the timing of $t_v$ becomes latest. The timing $t_v^{min}$ can be represented by the following equation (7).

$$t_v^{min} = \frac{\theta}{\lambda\beta} + T_{in} \quad (7)$$

The fact that the left side of the equation (6) is 0 means that the timing at which the step waveform is output from the comparison unit 18 is the latest.

On the other hand, when the value $x_i$ represented by the electrical signal given to each input terminal 15 is a maximum value 1, the left side of the equation (6) becomes $\beta$, so that the timing of $t_v$ becomes earliest. The timing $t_v^{max}$ is represented by the following equation (8).

$$t_v^{max} = \frac{\theta}{\lambda\beta} \quad (8)$$

The fact that the right side of the equation (6) is $\beta$ means that the timing at which the step waveform is output from the comparison unit 18 is the earliest. Therefore, from the equations (7) and (8), a period $T_2$ during which the step waveform is output from the comparison unit 18 is $[t_v^{max}, t_v^{min}]$, and a time length $T_v$ of the period $T_2$ can be given by the following equation (9).

$$T_v = t_v^{min} - t_v^{max} = T_{in} \quad (9)$$

Hence, the time length $T_v$ of the period $T_2$ during which the step waveform is output from the comparison unit 18 becomes equal to the time length $T_{in}$ of the period $T_1$ during which the electrical signal is given to each input unit 13.

In order to reflect all of the electrical signals given to the respective input units 13 to the calculation target value of the multiplier-accumulator 11a, the period $T_2$ needs to be present on and after the period $T_1$, and $\theta$ needs to be an appropriate value. For that purpose, a condition shown in the following equation (10) is required.

$$t_v^{max} > T_{in} \quad (10)$$

From the equation (8), the equation (10) can be transformed into the following equation (11).

$$\theta > \lambda\beta T_{in} \quad (11)$$

Here, when $\varepsilon(>0)$ of a minute amount is defined, the threshold $\theta$ can be expressed by the following equation (12) using $\varepsilon$.

$$\theta = (1+\varepsilon)\lambda\beta T_{in} \quad (12)$$

From the equation (12), the threshold $\theta$ needs to be proportional to a product of the sum total $\beta$ of the loads $w_i$ and the length $T_{in}$ of the period $T_i$.

The following equation (13) is obtained from the equations (7) and (12), and the following equation (14) is obtained from the equations (8) and (12).

$$t_v^{min} = 2T_{in} + \varepsilon T_{in} \quad (13)$$

$$t_v^{max} = T_{in} + \varepsilon T_{in} \quad (14)$$

Hence, a time range of the period $T_2$ can be represented by the equations (13) and (14).

Figure 3:
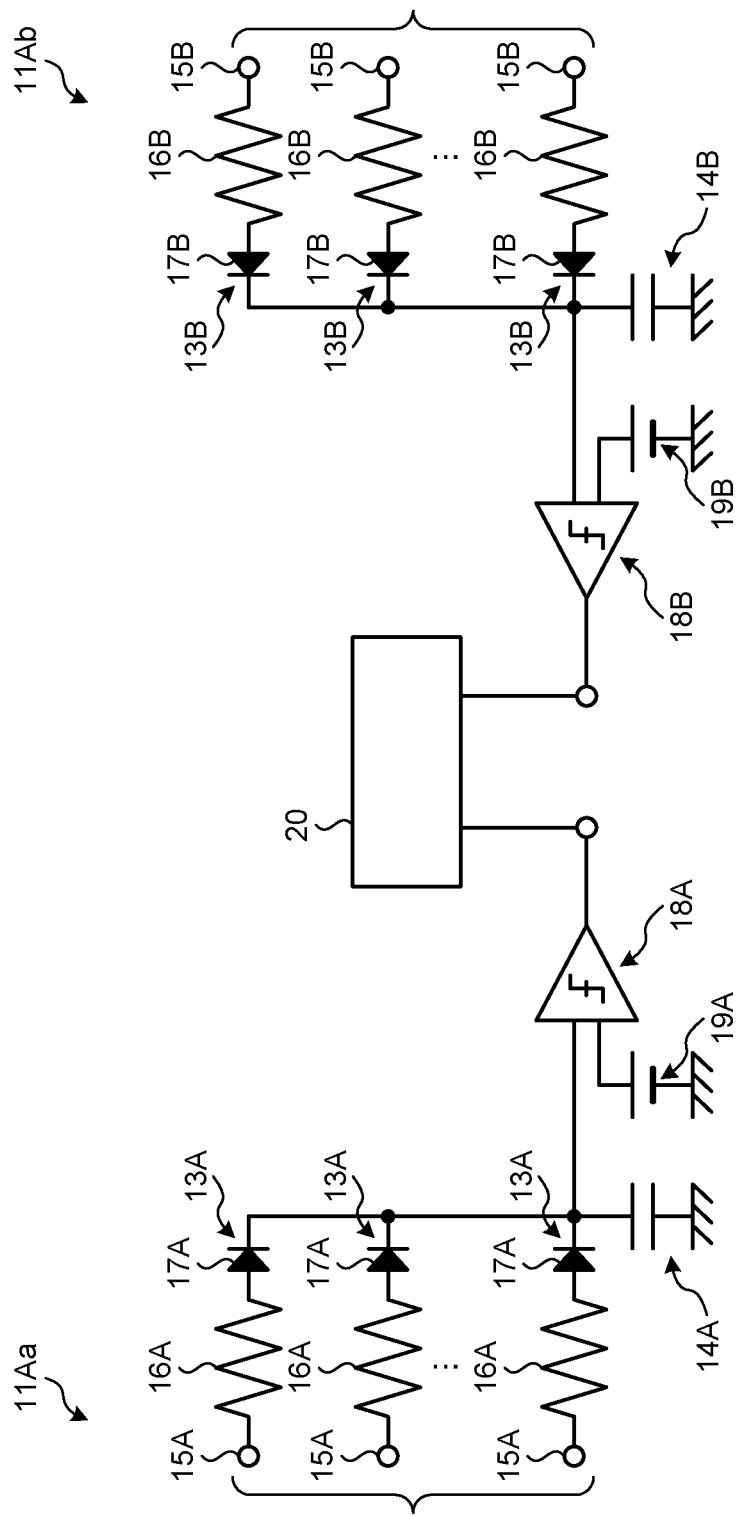
FIG. 3 is a diagram illustrating an example of a configuration of the multiplier-accumulator.

Referring to FIG. 3, a description will be given of a multiplier-accumulator that obtains the calculation target value while distinguishing the load $w_i$ into the positive load $w_i^+$ and the negative load $w_i^-$. FIG. 3 is a view illustrating an example of a configuration of the multiplier-accumulator that obtains the calculation target value while distinguishing the load $w_i$ into the positive load $w_i^+$ and the negative load $w_i^-$.

For the N electrical signals given in the period $T_1$, a multiplier-accumulator 11A associates $w_i^+$ with each of $N^+$ electrical signals ($N^+$ is a natural number of N or less). The multiplier-accumulator 11A associates an absolute value of $w_i^-$ with each of ($N-N^+$) electrical signals. Such a multiplier-accumulator 11A includes a first multiplier-accumulator 11Aa, a second multiplier-accumulator 11Ab, and a calculation unit 20.

As illustrated in FIG. 3, the first multiplier-accumulator 11Aa includes $N^+$ first input units 13A, a first storage unit 14A, a first comparison unit 18A, and a first threshold power supply 19A.

The first input units 13A are connected in parallel to one another. Each of the first input units 13A associates the load $w_i^+$ with the electrical signal given within the predetermined period $T_1$, and outputs a response waveform in which a voltage changes with the passage of time. Further, as illustrated in FIG. 3, each first input unit 13A includes a first input terminal 15A, a first resistor 16A, and a first diode 17A. The first input terminal 15A, the first resistor 16A, and the first diode 17A are connected in series to one another. In each first input unit 13A, for example, each first input terminal 15A is given an electrical signal of the same voltage at different timing within the period $T_i$.

The first storage unit 14A is connected to each first input unit 13A and stores an electric charge output from each first input unit 13A. The first storage unit 14A is, for example, a capacitor.

The first comparison unit 18A compares a first threshold and a signal input thereto with each other, and outputs a step waveform at the time (hereinafter, referred to as first timing) when the input signal exceeds the first threshold. The first comparison unit 18A is, for example, a comparator. The first comparison unit 18A is connected to the first storage unit 14A and the first threshold power supply 19A.

The first threshold power supply 19A gives a first threshold voltage to the first comparison unit 18A. Here, a magnitude of the first threshold voltage is defined as $\theta^+$. In this case, the first comparison unit 18A outputs the step waveform at timing at which the voltage held in the first storage unit 14A exceeds the first threshold $\theta^+$.

As illustrated in FIG. 3, the second multiplier-accumulator 11Ab includes $(N-N^+)=N^-$ second input units 13B, a second storage unit 14B, a second comparison unit 18B, and a second threshold power supply 19B.

The second input units 13B are connected in parallel to one another. Each of the second input units 13B associates the load $w_i^-$ with the electrical signal given within the predetermined period $T_1$, and outputs a response waveform in which a voltage changes with the passage of time. Further, as illustrated in FIG. 3, each second input unit 13B includes a second input terminal 15B, a second resistor 16B, and a second diode 17B. The second input terminal 15B, the second resistor 16B, and the second diode 17B are connected in series to one another. In each second input unit 13B, for example, each second input terminal 15B is given an electrical signal of the same voltage at different timing within the period $T_i$. That is, the period during which $N^+$ electrical signals are given to the $N^+$ first input units 13A coincides with the period during which $N^-$ electrical signals are given to the $N^-$ second input units 13B.

The second storage unit 14B is connected to each second input unit 13B and stores an electric charge output from each second input unit 13B. The second storage unit 14B is, for example, a capacitor.

The second comparison unit 18B compares a second threshold and a signal input thereto with each other, and outputs a step waveform at the time (hereinafter, referred to as second timing) when the input signal exceeds the second threshold. The second comparison unit 18B is, for example, a comparator. The second comparison unit 18B is connected to the second storage unit 14B and the second threshold power supply 19B.

The second threshold power supply 19B gives a second threshold voltage to the second comparison unit 18B. Here, a magnitude of the second threshold voltage is defined as $\theta^-$. In this case, the second comparison unit 18B outputs the step waveform at timing at which the voltage held in the second storage unit 14B exceeds the second threshold $\theta^-$.

Here, a magnitude of the first threshold is defined as $\theta^+$, a magnitude of the second threshold is defined as $\theta^-$, the sum total of $N^+$ positive loads $w_i^+$ is defined as $\beta^+$, and the sum total of absolute values of $N^-$ negative loads $w_i^-$ is defined as $\beta^-$. In this case, $\beta^+$ and $\beta^-$ can be represented by the following equations (15) and (16), respectively.

$$\beta^+ = \sum_{i=1}^{N^+} w_i^+ \tag{15}$$

$$\beta^- = \sum_{i=1}^{N^-} |w_i^-| \ (>0) \tag{16}$$

Here, $N=N^+ + N^-$ and $\beta = \beta^+ - \beta^-$ are established. Assuming that the first timing is defined as $t_v^+$ and that the second timing is defined as $t_v^-$, then from the equation (4), $\theta^+$ and $\theta^-$ can be represented by the following equations (17) and (18), respectively.

$$\sum_{i=1}^{N^+} w_i^+ (t_v^+ - t_i) = \theta^+ \tag{17}$$

$$\sum_{i=1}^{N^-} |w_i^-| (t_v^- - t_i) = \theta^- \ (>0) \tag{18}$$

Note that $\lambda=1$ is set in the equations (17) and (18). The following equations (19) and (20) are obtained when the calculation target value (sum of N multiplication values) is divided into a calculation target value (hereinafter, a first product sum value) of the positive load $w_i^+$ and a calculation target value (hereinafter, a second product sum value) of the negative load $w_i^-$.

$$\sum_{i=1}^{N^+} w_i^+ \cdot x_i = \frac{\theta^+ + \beta^+ (T_{in} - t_v^+)}{T_{in}} \tag{19}$$

$$\sum_{i=1}^{N^-} |w_i^-| \cdot x_i = \frac{\theta^- + \beta^- (T_{in} - t_v^-)}{T_{in}} \tag{20}$$

The calculation unit 20 calculates the calculation target value by subtracting the second product sum value from the first product sum value. Specifically, the calculation unit 20 is connected to the first comparison unit 18A, detects pulse signals transmitted from the first comparison unit 18A, and calculates the first product sum value. The calculation unit 20 is connected to the second comparison unit 18B, detects pulse signals transmitted from the second comparison unit 18B, and calculates the second product sum value.

In other words, the calculation unit 20 detects that the voltage held in the first storage unit 14A has reached the first threshold $\theta^+$, and calculates the first product sum value. The calculation unit 20 detects that the voltage held in the second storage unit 14B has reached the second threshold $\theta^-$, and calculates the second product sum value. Then, the calculation unit 20 calculates the calculation target value by subtracting the second product sum value from the first product sum value. An equation for calculating the calculation target value can be represented by the following equation (21).

$$\sum_{i=1}^{N} w_i \cdot x_i = \frac{\theta^+ - \theta^- + \beta T_{in} - (\beta^+ t_v^+ - \beta^- t_v^-)}{T_{in}} \tag{21}$$

Here, it is assumed that the calculation unit 20 calculates the first product sum value and the second product sum value in the period $T_2$. In this case, in order to reflect all of the electrical signals given to the respective first input units 13A and all of the electrical signals given to the respective second input units 13B to the calculation target value, the period $T_2$ needs to be present on and after the period $T_1$. Moreover, the time length of the period $T_1$ and the time length of the period $T_2$ are both $T_{in}$. Then, for that purpose, the first threshold $\theta^+$ and the second threshold $\theta^-$ need to satisfy the following equations (22) and (23), respectively.

$$\theta^+ = (1+\varepsilon)\lambda\beta^+ T_{in} \tag{22}$$

$$\theta^- = (1+\varepsilon)\lambda\beta^- T_{in} \tag{23}$$

As shown in the equation (22), the first threshold $\theta^+$ is proportional to a product of the sum total $\beta^+$ of $N^+$ loads $w_i^+$ and the length $T_{in}$ of the period $T_i$. As shown in the equation (23), the second threshold $\theta^-$ is proportional to a product of the sum total $\beta^-$ of the absolute values of $N^-$ loads $w_i^-$ and the length $T_{in}$ of the period $T_i$. The first threshold $\theta^+$ and the second threshold $\theta^-$ satisfy the above-described relationships, whereby all of the electrical signals given to the respective first input units 13A and all of the electrical signals given to the respective second input units 13B can be reflected to the calculation target value. In other words, values of the first threshold $\theta^+$ and the second threshold $\theta^-$ just need to be determined so as to satisfy the equations (22) and (23).

However, on a right side of the equation (21), a product of $t_v^+$ and $\beta^+$ and a product of $t_v^-$ and $\beta^-$ are present. Therefore, in order to calculate the calculation target value based on the equation (21), the calculation unit 20 requires a complicated circuit configuration.

Therefore, in order to simplify the circuit configuration of the calculation unit 20, an absolute value of a dummy load $w_0$ that corresponds to a virtual electrical signal of a value 0 and is obtained by multiplying a difference between $\beta^+$ and $\beta^-$ by −1 is added to a smaller one of $\beta^+$ and $\beta^-$. $w_0$ can be represented by the following equation (24).

$$w_O = -(\beta^+ + \beta^-) \tag{24}$$

By adding the dummy load $w_0$, $\beta^+ = \beta^-$ is established. From the equations (22) and (23), $\theta^+ = \theta^-$ is established. Therefore, $\beta^+ = \beta^- = \beta_0$ is established, and the equation (21) can be transformed into the following equation (25).

$$\sum_{i=1}^{N} w_i \cdot x_i = \frac{\beta_O(t_v^- - t_v^+)}{T_{in}} \tag{25}$$

As shown in the equation (25), when the positive load $w_i^+$ and the negative load $w_i^-$ are mixed, the calculation target value can be calculated based on a difference between the first timing and the second timing.

Here, if "$t_v^- - t_v^+$" that is the difference between the first timing and the second timing is input to a next layer as it is, "$t_v^- - t_v^+$" is multiplied by a reciprocal (1/β) of the sum total of the loads. That is, for example, when simulation of a neural network is executed using this multiply-accumulate method, a distribution of the outputs from the multiplier-accumulator 11 is reduced as going deeper.

[1-3. Network Configuration of Multiply-Accumulate Device]

Figure 4:
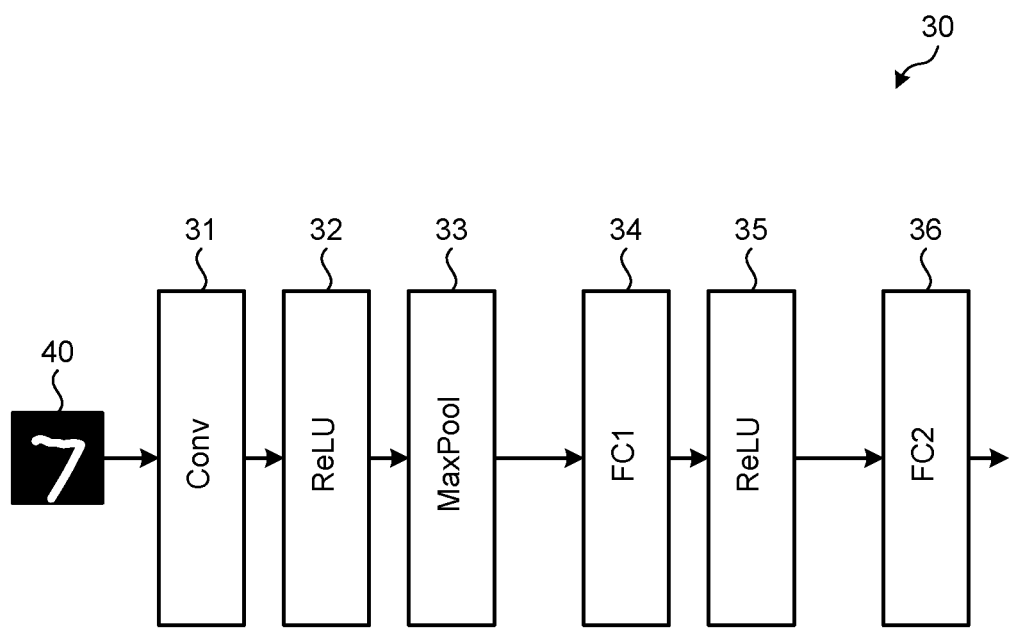
FIG. 4 is a diagram for explaining output timing of the multiplier-accumulator.

Referring to FIG. 4, a description will be given of an example of a case in which the distribution of the outputs from the multiplier-accumulator 11 is reduced. FIG. 4 is a diagram illustrating an example of a configuration of deep neural networks (DNNs) of the multiply-accumulate device 10.

As illustrated in FIG. 4, DNN 30 includes a Convolution layer 31, a first ReLU layer 32, a MaxPooling layer 33, a first FC layer 34, a second ReLU layer 35, and a second FC layer 36. Processing for causing the DNN 30 as described above to recognize a character 40 of MNIST is considered.

Figure 5:
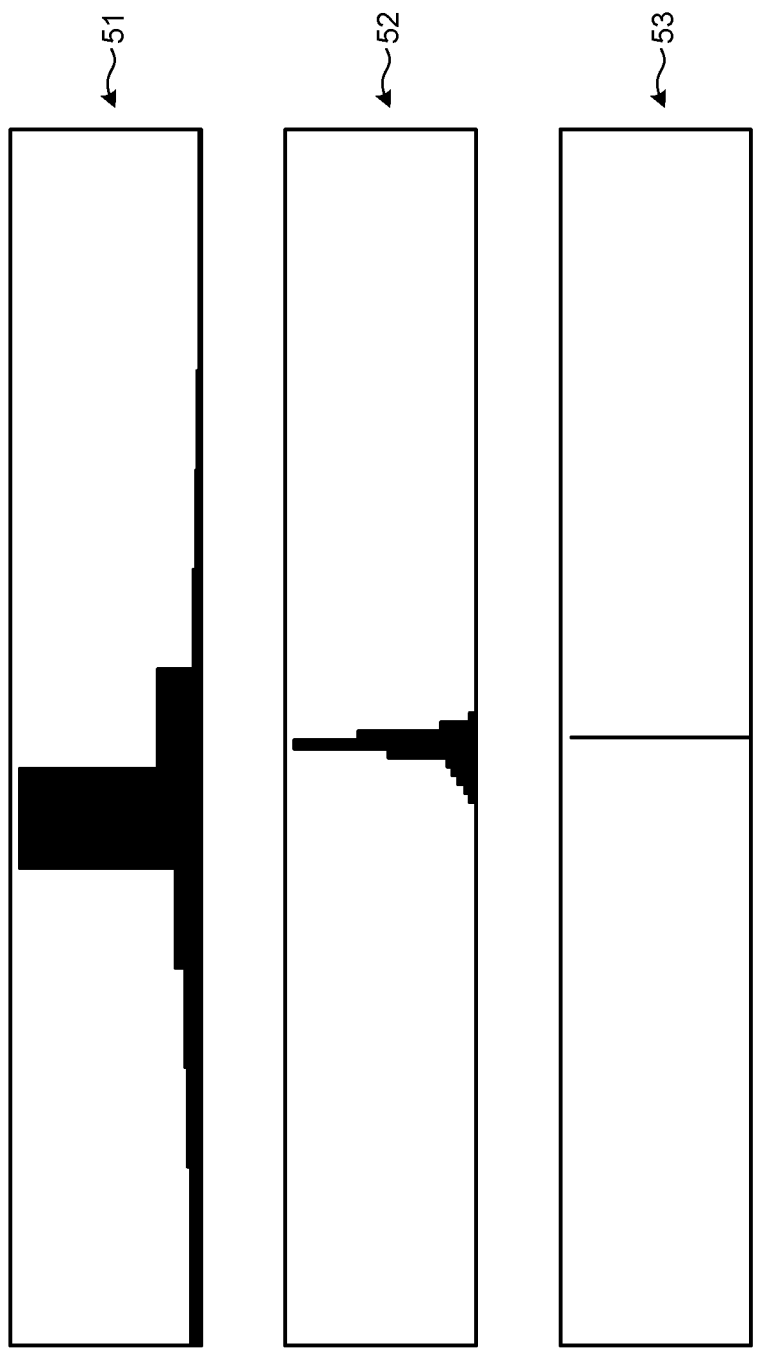
FIG. 5 is a diagram for explaining distributions of pieces of the output timing of the multiplier-accumulator.

FIG. 5 is histograms illustrating distributions of the outputs from the multipliers-accumulators in the respective layers. A histogram 51 is a histogram showing a distribution of $(t_v^- - t_v^+)$ output from the Convolution layer 31. A histogram 52 is a histogram showing a distribution of $(t_v^- - t_v^+)$ output from the first FC layer 34. A histogram 53 is a histogram showing a distribution of $(t_v^- - t_v^+)$ output from the second FC layer 36. As illustrated in FIG. 5, while the histogram 51 has a wide time distribution of pieces of output timing, the histogram 53 has output timing concentrated at one point. In this case, it may become impossible to determine the timing at which the step waveform is output.

Therefore, the multiply-accumulate device according to the present disclosure executes processing for expanding an interval of the timing at which the step waveform is output. Thus, the multiply-accumulate device according to the present disclosure can delay a time from the output of the step waveform to the output of the next step waveform, and accordingly, can prevent the concentration of the timing at which the step waveform is output.

2. First Embodiment

[2-1. Configuration of Multiply-Accumulate System According to First Embodiment]

Figure 6:
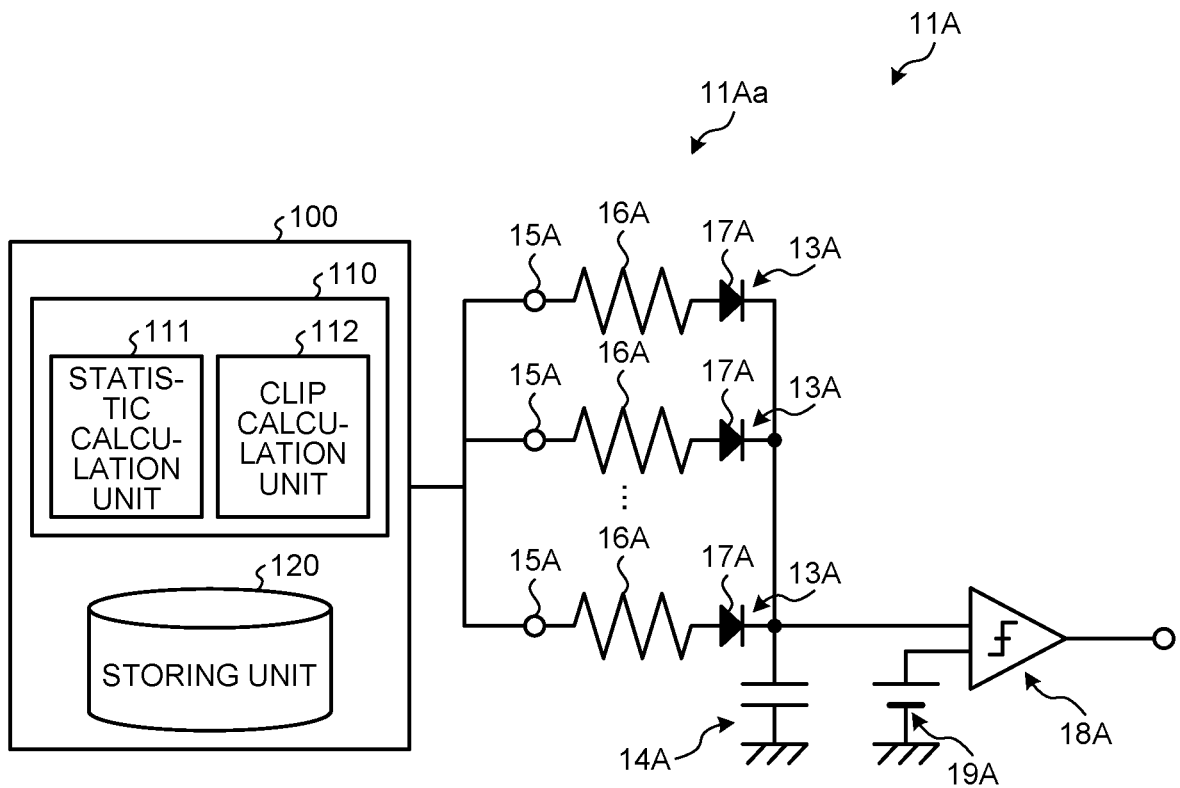
FIG. 6 is a diagram illustrating an example of a multiply-accumulate system according to a first embodiment of the present disclosure.

Referring to FIG. 6, a description will be given of a multiply-accumulate system according to a first embodiment of the present disclosure. FIG. 6 is a diagram illustrating an example of the multiply-accumulate system according to the first embodiment of the present disclosure.

As illustrated in FIG. 6, the multiply-accumulate system 1 includes a multiplier-accumulator 11A and a calculation device 100. As will be specifically described later, the calculation device 100 executes a statistical calculation for an input signal. The calculation device 100 outputs the input signal, for which the statistical calculation is executed, to the multiplier-accumulator 11A. In this case, the multiplier-accumulator 11*a* executes multiplication-accumulation for the input signal for which the statistical calculation is executed. Note that, for the sake of simplicity, FIG. 6 illustrates only the first multiplier-accumulator 11Aa in the multiplier-accumulator 11A. The calculation device 100 can be applied to the second multiplier-accumulator 11Ab similarly to the first multiplier-accumulator 11Aa, and accordingly, a description thereof will be omitted.

The calculation device 100 includes a control unit 110 and a storing unit 120.

The control unit 110 controls each unit that constitutes the calculation device 100. For example, the control unit 110 develops and executes various programs, which are stored in the storing unit 120, thereby controlling each unit that constitutes such a calculation processing device. The control unit 110 can be achieved by, for example, an electronic circuit including a central processing unit (CPU). The control unit 110 includes a statistic calculation unit 111 and a clip calculation unit 112.

The statistic calculation unit 111 executes a statistical calculation for the input signal. For example, when the input signal is an image, the statistic calculation unit 111 calculates statistics such as an average of pixel values and a standard deviation thereof for each input image. For example, when the pixel value of the image is $a_i$, the average of the pixel values is $\mu$, and the standard deviation of the pixel values is $\sigma$, the statistic calculation unit 111 standardizes $(a_i - \mu)/\sigma = b_i$ and the pixel value $a_i$ to a new pixel value $b_i$. The statistic calculation unit 111 multiplies the standardized pixel value by a coefficient corresponding to the pixels. Here, the coefficient is, for example, a coefficient expressed by $(1/\alpha)$ with $\alpha$ as an arbitrary number. More specifically, the statistic calculation unit 111 multiplies the standardized pixel value by the coefficient so that the standardized pixel value approaches an input value range of the multiplier-accumulator 11A. The statistic calculation unit 111 does not necessarily have to multiply the standardized pixel value by the coefficient depending on a value of the standardized pixel value. The statistic calculation unit 111 does not have to multiply the standardized pixel value by the coefficient, for example, when the value of the standardized pixel value is relatively close to the input value range of the multiplier-accumulator 11A. A description will be given below of the case in which the statistic calculation unit 111 standardizes the pixel value, but this is an example and does not limit the present disclosure. The statistic calculation unit 111 may convert the pixel values based on the statistics by a method other than the standardization.

The clip calculation unit 112 clips the standardized input signal within a predetermined range. For example, the clip calculation unit 112 clips the standardized input signal in a range corresponding to the input value range of the multiplier-accumulator 11A. When the input value range of the multiplier-accumulator 11A is, for example, −1 or more and 1 or less, the clip calculation unit 112 clips the standardized input signal in the range of −1 or more and 1 or less. In this case, the clip calculation unit 112 clips values less than −1 to −1 and values greater than 1 to 1.

[2-2. Standardized Image Data According to First Embodiment]

Figure 7:
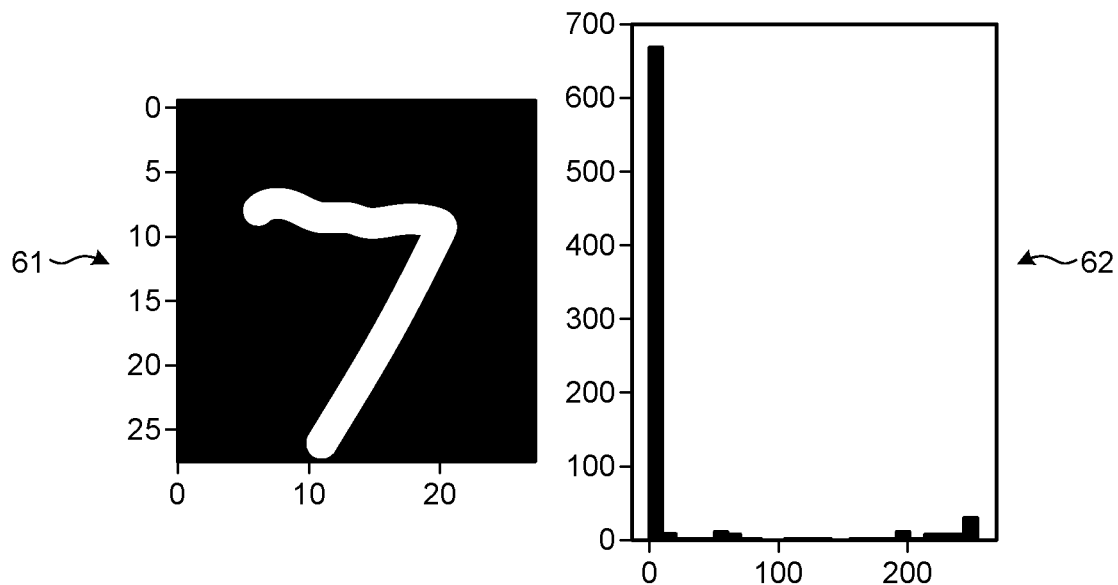
FIG. 7 is a diagram illustrating an example of input image data and standardized input image data.
Figure 7:
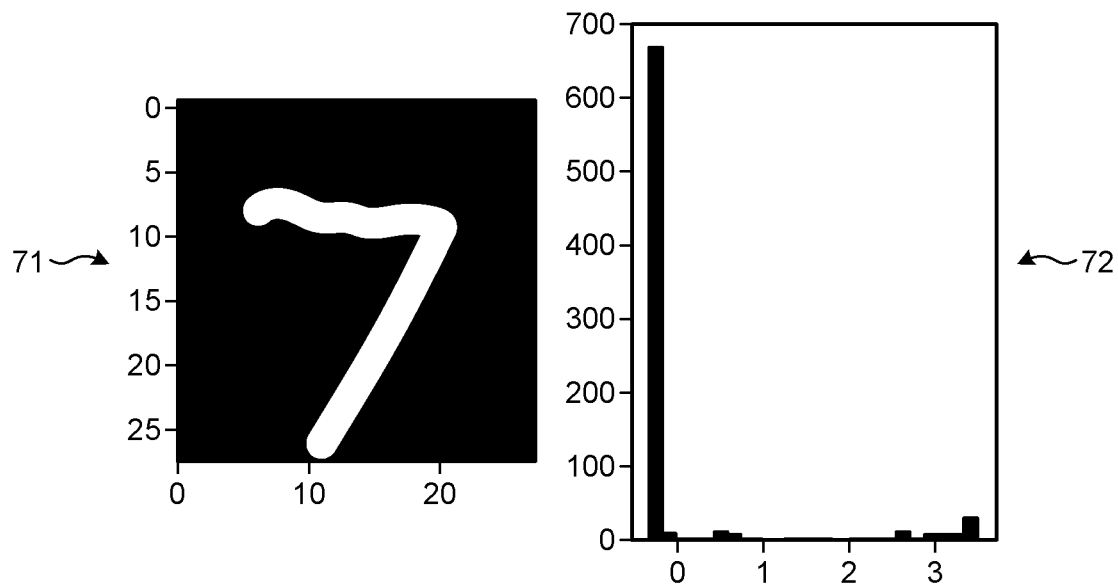

Referring to FIG. 7, a description will be given of an example of the input image. FIG. 7 is diagrams illustrating an example of the input image and the standardized input image. The following description will be given on the assumption that the input signal is image data, but this is an example, and does not limit the present disclosure.

As illustrated in FIG. 7, input image data 61 uses, for example, character data "7" of Modified National Institute of Standards and Technology (MNIST). A size of the character data is, for example, 28×28 pixels. In this case, a minimum value of pixel values of the input image data 61 is "0", a maximum value of the pixel values is "255", an average of the pixel values is about "23.54", and a standard deviation of the pixel values is about "65.94". In the input image data 61, pixel values in a black region are set to "0", and pixel values in a white region are set to "255". A histogram 62 is a histogram showing a distribution of the pixel values of the input image data 61. As shown in the histogram 62, most of the pixel values of the input image data 61 are "0", and some thereof are dispersed in "255".

Standardized image data 71 is image data obtained by standardizing the input image data 61 by the statistic calculation unit 111. In this case, a minimum value of pixel values of the standardized image data 71 is "−0.36", a maximum value of the pixel values is "3.51", an average of the pixel values is "0", and a standard deviation of the pixel values is "1". A histogram 72 is a histogram showing a distribution of the pixel values of the standardized image data 71. As shown in the histogram 72, the pixel values of the standardized image data 71 move to "−0.36" by standardizing the most frequent "0", for example.

Figure 8:
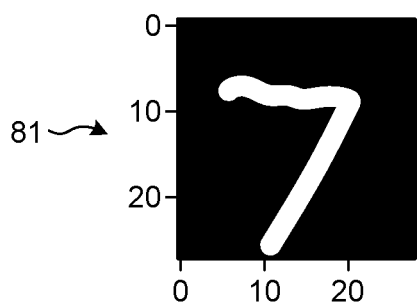
FIG. 8 is diagrams illustrating an example of clipped standardized input image data.
Figure 8:
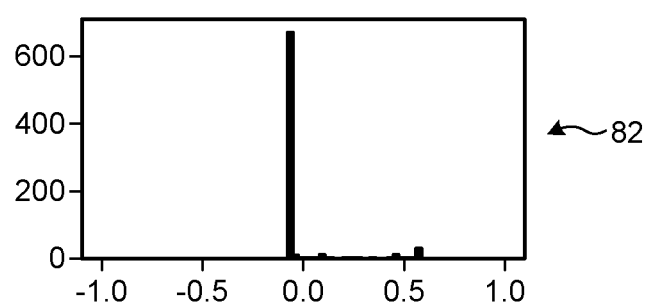
Figure 8:
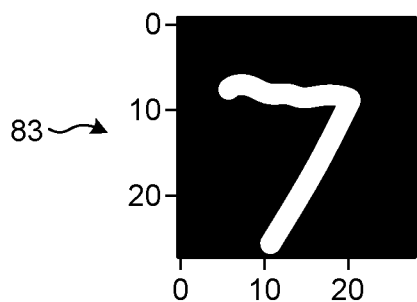
Figure 8:
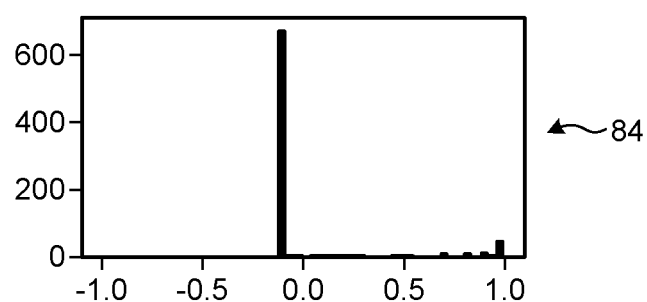
Figure 8:
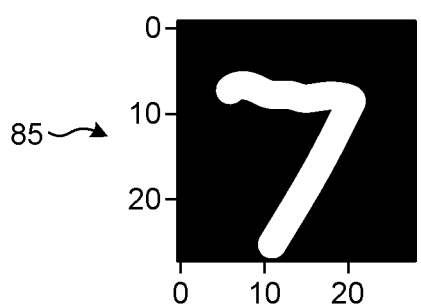
Figure 8:
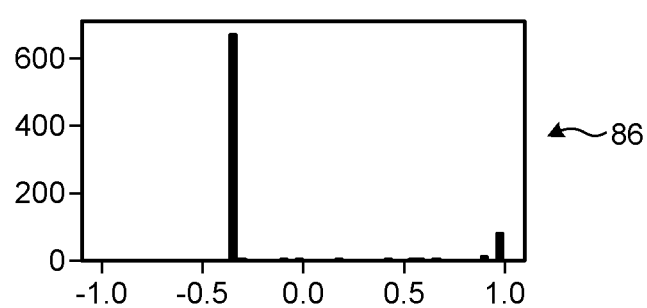

Referring to FIG. 8, a description will be given of the clipped standardized image data. FIG. 8 is diagrams illustrating an example of the clipped standardized image data.

Clip image data 81 is image data obtained by multiplying the standardized image data 71 by (⅙) by the statistic calculation unit 111 and clipping the multiplied standardized image data 71 in the range of −1 or more and 1 or less by the clip calculation unit 112. Minimum and maximum values of the clip image data 81 stay within the range of −1 or more and 1 or less at the time when the standardized image data 71 is multiplied by (⅙) by the statistic calculation unit 111, and accordingly, a result does not change no matter whether or not the clipping is performed by the clip calculation unit 112. The minimum value of the pixel values of the clip image data 81 is "−0.06", the maximum value is "0.58", an average thereof is "0", and a standard deviation thereof is "0.17". A histogram 82 is a histogram showing a distribution of the pixel values of the clip image data 81. As shown in the histogram 82, the pixel values of the clip image data 81 are not clipped to "−1" and "1", and most thereof are "−0.06".

Clip image data 83 is image data obtained by multiplying the standardized image data 71 by (⅓) by the statistic calculation unit 111 and clipping the multiplied standardized image data 71 in the range of −1 or more and 1 or less by the clip calculation unit 112. A minimum value of the clip image data 83 stays within the range of −1 or more and 1 or less at the time when the standardized image data 71 is multiplied by (⅓) by the statistic calculation unit 111, and accordingly, a maximum value thereof is clipped to "1". The minimum value of the pixel values of the clip image data 83 is "−0.12", the maximum value is "1", an average thereof is "0.01", and a standard deviation thereof is "0.31". A histogram 84 is a histogram showing a distribution of the pixel values of the clip image data 83. As shown in the histogram 84, as for the pixel values of the clip image data 83, values exceeding "1" are clipped to "1", and most thereof are "−0.12".

The clip image data 85 is image data clipped in the range of −1 or more and 1 or less by the clip calculation unit 112 without multiplying the standardized image data 71 by a coefficient. A minimum value of the clip image data 85 stays within the range of −1 or more and 1 or less at the time when the standardized image data 71 is standardized by the statistic calculation unit 111, and accordingly, a maximum value thereof is clipped to "1". A histogram 86 is a histogram showing a distribution of the pixel values of the clip image data 85. As shown in the histogram 86, as for the pixel values of the clip image data 85, values exceeding "1" are clipped to "1", and most thereof are concentrated on "−0.36". Further, the clip image data 85 has a thicker character than the clip image data 81 and the clip image data 83.

FIG. 6 will be referred to again. The calculation device 100 outputs image data such as the clip image data 81, the clip image data 83, and the clip image data 85 to the multiplier-accumulator 11A. In this case, the multiplier-accumulator 11A executes the multiplication-accumulation for the image data such as the clip image data 81, the clip image data 83, and the clip image data 85. That is, the multiplier-accumulator 11A executes the multiplication-accumulation not for the image data itself but for the image data in which the statistical calculation is executed for the image data. Thus, the difference $(t_v^- - t_v^+)$ between the first timing and the second timing is widened.

[2-3. Output Time Difference of Multiply-Accumulate System According to First Embodiment]

Figures 9, 10:
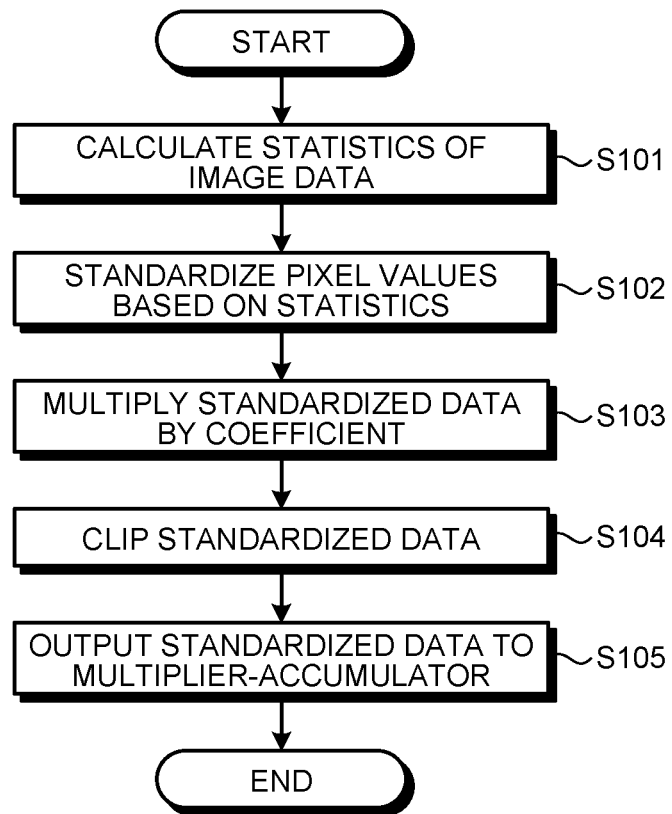
FIG. 9 is a diagram for explaining an output time difference between outputs from multipliers-accumulators of the multiply-accumulate system according to the first embodiment of the present disclosure.
FIG. 10 is a diagram illustrating an example of a processing flow of a calculation device of the multiply-accumulate system according to the first embodiment of the present disclosure.

Referring to FIG. 9, a description will be given of the output time difference of the signals output from the multiplier-accumulator 11A in the multiply-accumulate system according to the first embodiment. FIG. 9 is a diagram for explaining the output time difference from the multiplier-accumulator 11A. FIG. 9 is a table illustrating, for example, the output time difference from the multiplier-accumulator 11A of the second FC layer 36 illustrated in FIG. 4. Further, in FIG. 9, the standard deviation is taken as σ, and the evaluation is performed with the output time difference of 6σ.

"Original" of a standardization method illustrated in FIG. 9 is an output time difference when the input image data 61 illustrated in FIG. 7 that is not standardized is input. The output time difference of the input image data 61 is $5.7 \times 10^{-10}$ seconds.

"Standardization for each image" of the standardization method is an output time difference when the clip image data 81, the clip image data 83, and the clip image data 85, which are illustrated in FIG. 8, are input to the multiply-accumulate device 10. 1/1 of 1/α is an output time difference when the clip image data 85 is input, and the output time difference is $1.1×10^{-9}$ seconds. ⅓ of 1/α is an output time difference when the clip image data 83 is input, and the output time difference is $9.0×10^{-10}$ seconds. ⅙ of 1/α is an output time difference when the clip image data 81 is input, and the output time difference is $5.2×10^{-10}$ seconds.

As illustrated in FIG. 9, when the clip image data 85 is input, the output time difference is about twice as wide as when the input image data 61 is input. When the clip image data 83 is input, the output time difference is about twice as wide as when the input image data 61 is input. The image data is input to the multiply-accumulate device 10 after being standardized in this way, whereby the output time difference is expanded.

[2-4. Standardization Procedure According to First Embodiment]

Referring to FIG. 10, a description will be given of processing of the control unit 110 of the calculation device 100. FIG. 10 is a flowchart illustrating an example of a processing flow of the control unit 110.

First, the control unit 110 calculates statistics such as the average and standard deviation of the pixel values of the image data input to the multiplier-accumulator 11A (Step S101).

The control unit 110 standardizes the pixel values of the image data based on the calculated statistics (Step S102). Next, the control unit 110 multiplies the pixel values by a coefficient corresponding to the standardized pixel value (Step S103). Note that Step S103 may be omitted depending on the standardized pixel value.

The control unit 110 clips the standardized data multiplied by the coefficient in a specific range (Step S104). Note that Step S104 may be omitted depending on the standard pixel value or the standardized pixel value multiplied by the coefficient.

Then, the control unit 110 outputs the standardized data, which is clipped in the specific range, to the multiplier-accumulator 11A (Step S105). Thus, the multiplier-accumulator 11A executes multiplication-calculation for the standardized image data.

As mentioned above, in the multiply-accumulate system 1 according to the first embodiment, the statistical calculation is executed for the input image data, and the input image data is output to the multiplier-accumulator 11A after being standardized based on the statistics. Thus, the multiplier-accumulator 11A executes the multiplication-calculation for the input image data in which the pixel values are standardized. As a result, the difference ($t_v^- - t_v^+$) between the first timing and the second timing can be widened.

3. Second Embodiment

[3-1. Configuration of Multiply-Accumulate System According to Second Embodiment]

Figure 11:
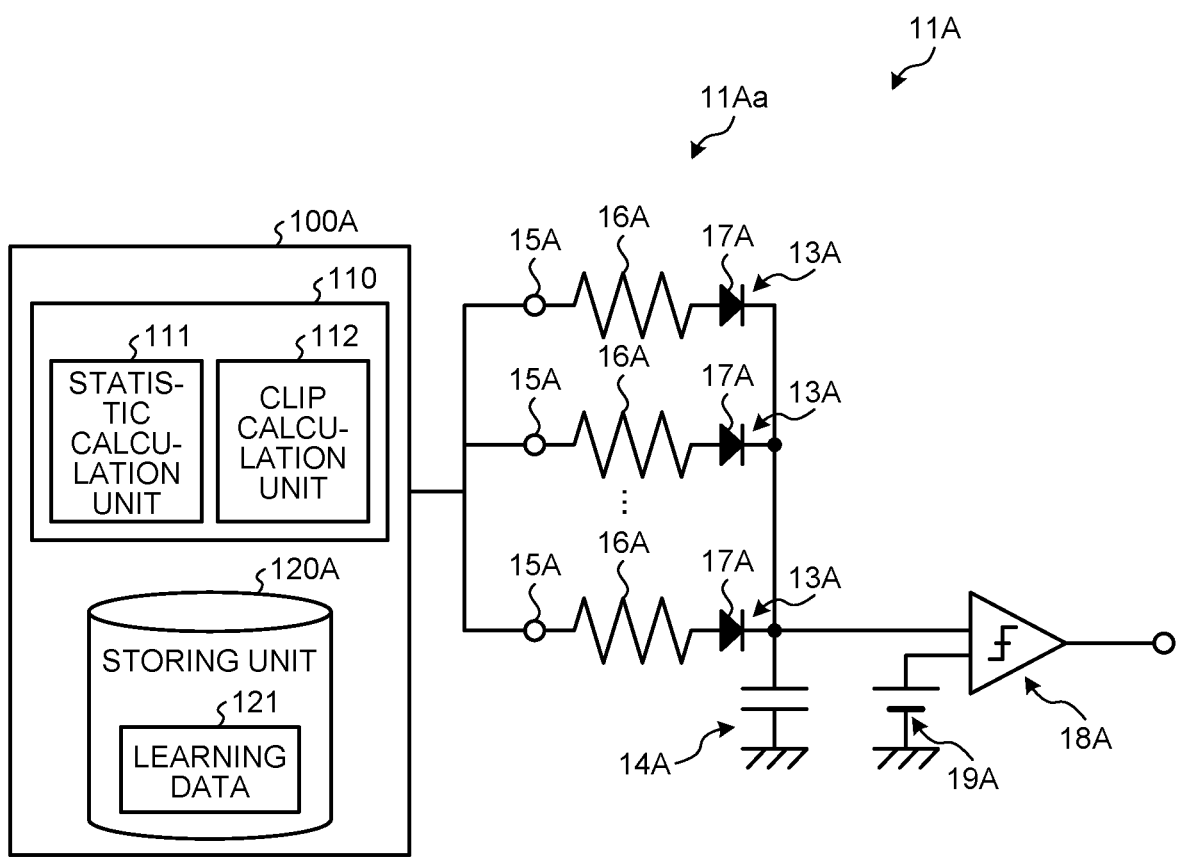
FIG. 11 is a diagram illustrating an example of a multiply-accumulate system according to a second embodiment of the present disclosure.

Referring to FIG. 11, a description will be given of a multiply-accumulate system 1A according to a second embodiment of the present disclosure. FIG. 11 is a diagram illustrating an example of the multiply-accumulate system 1A according to the second embodiment of the present disclosure.

As illustrated in FIG. 11, learning data 121 is stored in a storing unit 120A of a calculation device 100A. The multiply-accumulate system 1A according to the second embodiment is different from the multiply-accumulate system 1 according to the first embodiment in that the storing unit 120A stores learning data 121.

The learning data 121 is, for example, statistics including an average, a standard deviation, and the like in the entire image data for use in the learning of the multiply-accumulate device 10. Further, the learning data 121 may include, as a statistical value, α of a coefficient (1/α) by which the statistic calculation unit 111 multiplies the standardized pixel values. In this case, α may be learned by backpropagation and stored as the learning data 121, for example.

In the multiply-accumulate system 1A according to the second embodiment, the statistic calculation unit 111 standardizes the pixel values of the input image data based on the learning data 121. For example, when the statistic calculation unit 111 standardizes the input image data 61, which is illustrated in FIG. 7, based on the learning data 121, a minimum value of the pixels is "−0.42", a maximum value thereof is "2.82", an average thereof is about "−0.13", and a standard deviation thereof is about "0.83". As described above, in the multiply-accumulate system 1A according to the second embodiment, since the statistic calculation unit 111 uses the learning data 121 as the statistics, the pixel values are not completely standardized. However, even in such a case, the difference ($t_v^- - t_v^+$) between the first timing and the second timing can be widened.

Further, in the multiply-accumulate system 1A according to the second embodiment, the clip calculation unit 112 clips the input signal, which is standardized based on the learning data 121, within a predetermined range.

[3-2. Standardized Image Data According to Second Embodiment]

Figure 12:
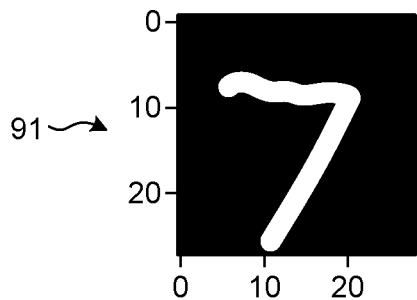
FIG. 12 is diagrams illustrating an example of clipped standardized input image data.
Figure 12:
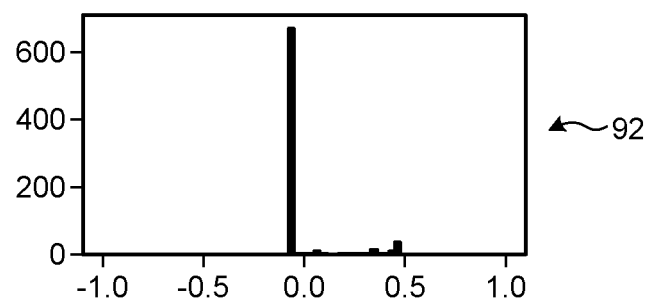
Figure 12:
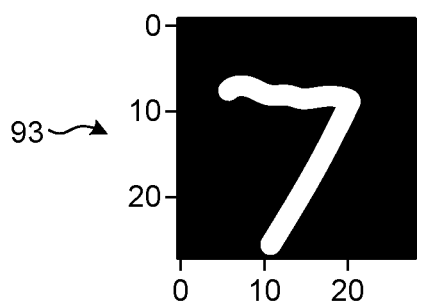
Figure 12:
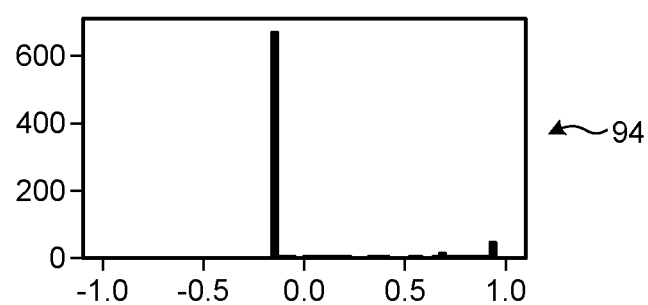
Figure 12:
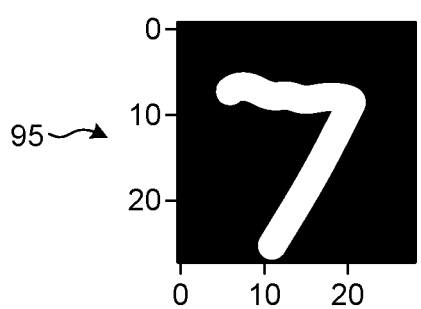
Figure 12:
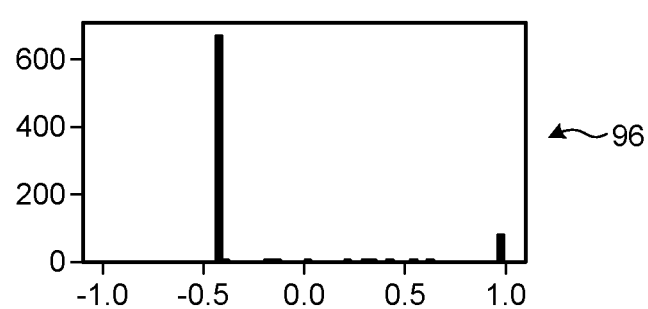

Referring to FIG. 12, a description will be given of the clipped standardized image data. FIG. 12 is diagrams illustrating an example of the clipped standardized input image data.

Clip image data 91 is image data obtained by multiplying the standardized image data, which is standardized based on the learning data 121, by (⅙) by the statistic calculation unit 111 and clipping the multiplied standardized image data in the range of −1 or more and 1 or less by the clip calculation unit 112. Minimum and maximum values of the clip image data 91 stay within the range of −1 or more and 1 or less at the time when the standardized image data is multiplied by (⅙) by the statistic calculation unit 111, and accordingly, a result does not change no matter whether or not the clipping is performed by the clip calculation unit 112. A minimum value of the pixel values of the clip image data 91 is "−0.07", a maximum value thereof is "0.47", an average thereof is "0.021", and a standard deviation thereof is "0.14". A histogram 92 is a histogram showing a distribution of the pixel values of the clip image data 91. As shown in the histogram 92, the pixel values of the clip image data 91 are not clipped to "−1" and "1", and most thereof are "−0.07".

Clip image data 93 is image data obtained by multiplying the standardized image data, which is standardized based on the learning data 121, by (⅓) by the statistic calculation unit 111 and clipping the multiplied standardized image data in the range of −1 or more and 1 or less by the clip calculation unit 112. A minimum value of the clip image data 93 stays within the range of −1 or more and 1 or less at the time when the standardized image data is multiplied by (⅙) by the statistic calculation unit 111, and accordingly, a maximum value thereof is clipped to "1". The minimum value of the pixel values of the clip image data 93 is "−0.14", the maximum value is "1", an average thereof is "0.04", and a standard deviation thereof is "0.28". A histogram 94 is a histogram showing a distribution of the pixel values of the clip image data 93. As shown in the histogram 94, as for the pixel values of the clip image data 93, values exceeding "1" are clipped to "1", and most thereof are "−0.14".

The clip image data 95 is image data clipped in the range of −1 or more and 1 or less by the clip calculation unit 112 without multiplying the standardized image data, which is standardized based on the learning data 121, by a coefficient. A minimum value of the clip image data 95 stays within the range of −1 or more and 1 or less at the time when the standardized image data is standardized by the statistic calculation unit 111, and accordingly, a maximum value thereof is clipped to "1". A histogram 96 is a histogram showing a distribution of the pixel values of the clip image data 95. As shown in the histogram 96, as for the pixel values of the clip image data 95, values exceeding "1" are clipped to "1", and most thereof are "−0.42". Further, the clip image data 95 has a thicker character than the clip image data 91 and the clip image data 93.

FIG. 11 will be referred to again. The calculation device 100A outputs image data such as the clip image data 91, the clip image data 93, and the clip image data 95 to the multiplier-accumulator 11A. In this case, the multiplier-accumulator 11A executes the multiplication-accumulation for the image data such as the clip image data 91, the clip image data 93, and the clip image data 95. Thus, the difference $(t_v^- - t_v^+)$ between the first timing and the second timing can be widened. For example, in the case of an output from the second FC layer 36 illustrated in FIG. 4, the difference between the first timing and the second timing $(t_v^- - t_v^+)$ is widened by standardizing the image data based on the learning data 121. The difference is doubled approximately. That is, even in the case of the standardization based on the learning data 121, the same effect as in the case of standardizing for each image data can be obtained.

[3-3. Output Time Difference of Multiply-Accumulate System According to Second Embodiment]

Referring to FIG. 13, a description will be given of the output time difference of the signals output from the multiplier-accumulator 11A in the multiply-accumulate system according to the second embodiment. FIG. 13 is a diagram for explaining the output time difference from the multiplier-accumulator 11A. FIG. 13 is a table illustrating, for example, the output time difference from the multiplier-accumulator 11A of the second FC layer 36 illustrated in FIG. 4. Further, in FIG. 9, the standard deviation is taken as σ, and the evaluation is performed with the output time difference of 6σ.

As described in FIG. 9, "original" of a standardization method illustrated in FIG. 13 is an output time difference of the input image data 61, and the output time difference is $5.7 \times 10^{-10}$ seconds.

"Standardization by learning data" of the standardization method is an output time difference when the clip image data 91, the clip image data 93, and the clip image data 95, which are illustrated in FIG. 12, are input to the multiply-accumulate device 10. 1/1 of 1/α is an output time difference when the clip image data 95 is input, and the output time difference is $1.2 \times 10^{-9}$ seconds. ⅓ of 1/α is an output time difference when the clip image data 93 is input, and the output time difference is $1.1 \times 10^{-9}$ seconds. ⅙ of 1/α is an output time difference when the clip image data 91 is input, and the output time difference is $5.3 \times 10^{-10}$ seconds.

As illustrated in FIG. 13, when the clip image data 95 is input, the output time difference is about twice as wide as when the input image data 61 is input. When the clip image data 93 is input, the output time difference is about twice as wide as when the input image data 61 is input. The image data is input to the multiply-accumulate device 10 after being standardized in this way, whereby the output time difference is expanded.

[3-4. Standardization Procedure According to Second Embodiment]

Referring to FIG. 14, a description will be given of processing of the control unit 110A of the calculation device 100A. FIG. 10 is a flowchart illustrating an example of a processing flow of the control unit 110A.

First, the control unit 110A acquires the learning data 121 for standardizing the image data input from the storing unit 120 to the multiplier-accumulator 11A (Step S201). Next, the control unit 110A standardizes the pixel values of the image data based on the acquired learning data 121 (Step S202). Since Steps S203 to S205 are the same as Steps S103 to S105 illustrated in FIG. 9, a description thereof will be omitted.

As mentioned above, in the multiply-accumulate system 1A according to the second embodiment, the input image data is output to the multiplier-accumulator 11A after being standardized based on the learning data 121. Thus, the multiplier-accumulator 11A executes the multiplication-calculation for the input image data in which the pixel values are standardized. As a result, the difference $(t_v^- - t_v^+)$ between the first timing and the second timing can be widened.

Although the respective embodiments of the present disclosure have been described above, the technical scope of the present disclosure is not limited to the above-mentioned respective embodiments as they are, and various modifications can be made without departing from the spirit of the present disclosure. Further, constituents which cover different embodiments and modified examples may be combined with one another as appropriate.

Note that the effects described in the present specification are merely examples and are not limited, and other effects may be present.

Note that the present technology may also adopt such configurations as follows.

(1)

A multiply-accumulate system comprising:

a statistic calculation unit that executes a standardization calculation for an input signal; and a multiply-accumulate device that executes multiplication-accumulation based on the standardized input signal.

(2)

The multiply-accumulate system according to (1), further comprising a clip calculation unit that clips the standardized input signal within a predetermined range, and outputs the clipped standardized input signal to the multiply-accumulate device.

(3)

The multiply-accumulate system according to (2), wherein the statistic calculation unit multiplies the standardized input signal by a coefficient corresponding to the standardized input signal, and the clip calculation unit clips, within a predetermined range, the input signal that is standardized and multiplied by the coefficient, and outputs the clipped input signal to the multiply-accumulate device.

(4)

The multiply-accumulate system according to any one of (1) to (3), wherein the statistic calculation unit executes the standardization calculation based on an average and standard deviation of values of the input signal.

(5)

The multiply-accumulate system according to any one of (1) to (4), further comprising a storing unit that holds learning data used for learning of the multiply-accumulate device, wherein the statistic calculation unit executes the standardization calculation based on the learning data.

(6) The multiply-accumulate system according to (2), wherein the clip calculation unit clips the standardized input signal based on an input value range of the multiply-accumulate device.

(7) The multiply-accumulate system according to (6), wherein the clip calculation unit clips the standardized input signal in a range of −1 or more and 1 or less.

(8) A multiply-accumulate method comprising:
executing a standardization calculation for an input signal; and
executing multiplication-accumulation based on the standardized input signal.

REFERENCE SIGNS LIST 1, 1A MULTIPLY-ACCUMULATE SYSTEM
10 MULTIPLY-ACCUMULATE DEVICE
11, 11a, 11A MULTIPLIER-ACCUMULATOR
12 EXTERNAL INPUT UNIT
13 INPUT UNIT
13A FIRST INPUT UNIT
13B SECOND INPUT UNIT
14 STORAGE UNIT
14A FIRST STORAGE UNIT
14B SECOND STORAGE UNIT
15 INPUT TERMINAL
15A FIRST INPUT TERMINAL
15B SECOND INPUT TERMINAL
16 RESISTOR
16A FIRST RESISTOR
16B SECOND RESISTOR
17 DIODE
17A FIRST DIODE
17B SECOND DIODE
18 COMPARISON UNIT
18A FIRST COMPARISON UNIT
18B SECOND COMPARISON UNIT
19 THRESHOLD POWER SUPPLY
19A FIRST THRESHOLD POWER SUPPLY
19B SECOND THRESHOLD POWER SUPPLY
100, 100A CALCULATION DEVICE
110, 110A CONTROL UNIT
111 STATISTIC CALCULATION UNIT
112 CLIP CALCULATION UNIT
120, 120A STORING UNIT

The invention claimed is:

1. A multiply-accumulate system comprising:
a memory storing program code; and
a processor configured to execute the program code to perform operations comprising:
receiving an input signal including a plurality of pixel values;
executing a standardization calculation for each of the pixel values in the input signal to produce a standardized input signal;
multiplying at least one of the pixel values in the standardized input signal by a coefficient to produce a revised standardized input signal having respective pixel values corresponding to a predetermined range;
clipping the revised standardized input signal to produce a clipped input signal, the clipping ensuring that each of the pixel values in the clipped input signal are within the predetermined range; and
executing multiplication-accumulation on the clipped input signal.

2. The multiply-accumulate system according to claim 1, wherein the standardization calculation is based on an average and standard deviation of the pixel values of the input signal.

3. The multiply-accumulate system according to claim 1, wherein the memory holds learning data used for learning corresponding to executing the multiplication-accumulation, and the standardization calculation is based on the learning data.

4. The multiply-accumulate system according to claim 1, wherein the predetermined range corresponds to an input value range of executing the multiplication-accumulation.

5. A multiply-accumulate method comprising:
receiving an input signal including a plurality of pixel values;
executing a standardization calculation for each of the pixel values in the input signal to produce a standardized input signal;
multiplying at least one of the pixel values in the standardized input signal by a coefficient to produce a revised standardized input signal having respective pixel values corresponding to a predetermined range;
clipping the revised standardized input signal to produce a clipped input signal, the clipping ensuring that each of the pixel values in the clipped input signal are within the predetermined range; and
executing multiplication-accumulation on the clipped input signal.

6. The multiply-accumulate method according to claim 5, wherein the standardization calculation is based on an average and standard deviation of the pixel values of the input signal.

7. The multiply-accumulate method according to claim 5, wherein a memory holds learning data used for learning corresponding to executing the multiplication-accumulation, and the standardization calculation is based on the learning data.

8. The multiply-accumulate method according to claim 5, wherein the predetermined range corresponds to an input value range of executing the multiplication-accumulation.

9. A non-transitory computer readable medium storing program code for multiply-accumulation, the program code being executable by a processor to perform operations comprising:
receiving an input signal including a plurality of pixel values;
executing a standardization calculation for each of the pixel values in the input signal to produce a standardized input signal;
multiplying at least one of the pixel values in the standardized input signal by a coefficient to produce a revised standardized input signal having respective pixel values corresponding to a predetermined range;
clipping the revised standardized input signal to produce a clipped input signal, the clipping ensuring that each of the pixel values in the clipped input signal are within the predetermined range; and
executing multiplication-accumulation on the clipped input signal.

10. The non-transitory computer readable medium according to claim 9, wherein the standardization calculation is based on an average and standard deviation of the pixel values of the input signal.

11. The non-transitory computer readable medium according to claim 9, wherein a memory holds learning data used for learning corresponding to executing the multiplication-accumulation, and the standardization calculation is based on the learning data.

12. The non-transitory computer readable medium according to claim 9, wherein the predetermined range corresponds to an input value range of executing the multiplication-accumulation.

* * * * *